United States Patent [19]

Hurley

[11] 4,201,740
[45] May 6, 1980

[54] PROCESS FOR PURIFYING AND ACTIVATING AQUEOUS INORGANIC SALT SOLUTIONS EMPLOYED IN THE WET SPINNING OF FILAMENTARY VINYL POLYMERS

[75] Inventor: Rupert B. Hurley, Williamsburg, Va.

[73] Assignee: Badische Corporation, Williamsburg, Va.

[21] Appl. No.: 913,638

[22] Filed: Jun. 8, 1978

[51] Int. Cl.$^2$ .................... D01F 13/00; D01F 6/18
[52] U.S. Cl. ................... 264/38; 260/29.6 AN; 260/29.6 AB; 264/182; 526/70
[58] Field of Search ............. 264/38, 182; 526/69, 526/70; 260/29.6 AN, 29.6 AB

[56] References Cited

U.S. PATENT DOCUMENTS

| | | | |
|---|---|---|---|
| 2,364,407 | 12/1949 | Walker | 264/38 |
| 2,942,027 | 6/1960 | Hewett et al. | 264/78 |
| 3,324,107 | 6/1967 | Andrews et al. | 264/206 |
| 3,632,699 | 1/1972 | Wilson et al. | 264/38 |
| 3,702,880 | 11/1972 | Matsushita et al. | 264/38 |
| 4,029,725 | 6/1977 | Hurley et al. | 264/38 |

*Primary Examiner*—Jay H. Woo
*Attorney, Agent, or Firm*—George F. Helfrich

[57] ABSTRACT

Filamentary vinyl polymer compositions are commonly prepared according to the following procedure:
(a) polymerizing a vinyl monomer in a concentrated aqueous inorganic salt solution to produce a vinyl polymer solution;
(b) spinning the resulting vinyl polymer solution into a coagulating bath containing an aqueous solution of the same inorganic salt as that employed in the polymerization step, the concentration of inorganic salt in the coagulating bath being maintained at a level which affords precipitation of the vinyl polymer to form a coherent filamentary gel;
(c) washing the gel so produced;
(d) recovering the concentrated aqueous inorganic salt solution from the washing and coagulation steps; and
(e) recycling the recovered concentrated aqueous inorganic salt solution into the polymerizing step. In such a process, undesirable copper ion impurities accumulate in the recovered concentrated aqueous inorganic salt solution. According to the present invention, the recovered aqueous inorganic salt solution is purified and activated prior to the recycling and use thereof by:
(1) introducing a source of sulfide ion into the recovered aqueous inorganic salt solution in an amount sufficient to provide a concentration of about 2 to about 200 ppm of sulfide ion, based upon the concentrated aqueous inorganic salt solution; and
(2) removing the precipitate resulting from said sulfide ion introduction.

4 Claims, No Drawings

PROCESS FOR PURIFYING AND ACTIVATING AQUEOUS INORGANIC SALT SOLUTIONS EMPLOYED IN THE WET SPINNING OF FILAMENTARY VINYL POLYMERS

BACKGROUND OF THE INVENTION

1. Field of the Invention

The present invention relates generally to a process for plastic article shaping. In particular, it relates to recycling of reclaimed and purified process material, especially of extrudant-receiving bath material.

2. Prior Art Statement

In the continuous production of filamentary vinyl polymer compositions by the wet spinning technique, it is well-known, common practice to polymerize a chosen vinyl monomer composition in a concentrated aqueous inorganic salt solution and to spin the resulting vinyl polymer solution into a coagulating bath which contains an aqueous solution of the same inorganic salt as that employed in the polymerization step. In the coagulation bath, the concentration of inorganic salt is maintained at a level which affords precipitation of the vinyl polymer to form a coherent filamentary gel. The vinyl polymer filamentary gel is then washed, and the inorganic salt is recovered as a concentrated solution from both the washing and coagulation baths by concentrating the effluents thereof. Such concentrated aqueous inorganic salt solution is recycled into the polymerization step for the purpose of economy of operation of the process. See, e.g., U.S. Pat. Nos. 2,916,348 and 2,558,730.

However, in the recovery of the inorganic salt solution from the washing and coagulation bath effluents, copper ion and other impurities accumulate, adversely affecting the solution polymerization, in addition to the final filamentary vinyl polymer product.

Over the years a number of processes for purifying and/or activating such and similar recovered effluents prior to the re-utilization thereof have been proposed. Of particular pertinence are the following:

1. U.S. Pat. No. 2,364,407 (Walker) discloses the removal of lead ions from a dilute sulfric acid bath used for cellulose coagulation and regeneration. The lead ions are precipitated as insoluble lead sulfide as a result of the introduction of hydrogen sulfide, and the precipitate of lead sulfide is removed by filtration of the dilute sulfuric acid through a bed of coal.

To introduce sulfide ions into a solution utilized in a vinyl polymerization (in accord with the process of the present invention) is not considered obvious to one of skill in this art in view of the Walker reference, because of the well-known fact that reducing agents such as sulfides (e.g., organic sulfides, esp. mercaptans) function as potent chain terminators in vinyl polmerizations. (That is to say, such compounds do not react with peroxides to yield free radicals.) Accordingly, one of skill in this art would reasonably avoid the utilization of such compounds, rationally considering them to have no utility in the instant vinyl polymerization process. That the sulfides presently employed have any utility at all is consequently unexpected; that their utilization results in a markedly enhanced polymerization activity (as hereinafter explicated) is surprising a fortiori.

2. U.S. Pat. No. 4,029,725 (Hurley, et al.) discloses a process for purifying and activating a recovered aqueous inorganic salt solution prior to the recycling and re-utilization thereof in a process for producing filamentary vinyl polymers. The purification step therein comprises complexing metallic ion impurities and adsorbing the resulting metal complexes along with organic molecular impurities on activated carbon. In order to ensure the maintenance of acceptable polymerization activity, an activator may be introduced into the recovered concentrated aqueous inorganic salt solution prior to recycling and re-utilization thereof. This activator is selected from the group consisting of tartronic acid, dihydroxytartaric acid, ethylenediaminetetraacetic acid, and water soluble aldehydes.

In the Hurley, et al. reference, the purification step employs adsorption, i.e., the taking up of a molecular material (e.g., a dissolved metal ion complex) on the surface of a solid. In the instant process, on the other hand, the mechanism of purification is solid particle entrapment by a filter bed. Consequently, the Hurley, et al. reference is not suggestive of the purification afforded by the present process. Moreover, in the Hurley, et al. reference, enhanced activation is achieved by the introduction of one or more of a group of organic compounds, none of which contains or generates the sulfide ions required in the process of the present invention. 3. U.S. Pat. No. 3,702,880 (Matsushita) discloses a purification procedure for a zinc chloride solution to be recycled to a vinyl polmerization step after a spinning operation has been effected. However, according to Matsushita, such a purification procedure must be a very particular oxidative treatment. See esp. Col. 3, line 1–14 and Col. 6, lines 66–69 of the Matsushita reference. Such teachings lead those of skill in the art away from the substance of the instant invention, which makes no use whatever of any such oxidation principle.

SUMMARY OF THE INVENTION

It is the primary object of the present invention to provide an efficient, low cost, non-oxidative process for the purification and activation of a recovered aqueous inorganic salt solution prior to the recycling thereof into the polymerization step in a continuous process for producing a filamentary vinyl polymer by the wet spinning of a vinyl polymer solution.

In accordance with the present invention, this object has been achieved, and the disadvantages presented by prior art processes have been obviated, by the practice of a procedure which comprehends introducing a source of sulfide ion into the recovered aqueous inorganic salt solution in an amount sufficient to provide a concentration of about 2 to about 200 ppm of sulfide ion, based upon the concentrated aqueous inorganic salt solution; and removing the precipitate resulting from said sulfide ion introduction.

Highly beneficial results are obtained when the vinyl polymer is an acrylonitrile polymer or interpolymer: e.g., poly (acrylonitrile); or an acrylic copolymer or terpolymer having at least about 85 weight percent of another polymerizable mono-olefinic monomer copolymerizable therewith; or a modacrylic polymer. Such highly beneficial results are also obtained when the aqueous inorganic salt solution comprises zinc chloride as the principal inorganic salt component, and the polymerization step is accomplished using a peroxide initiator system.

Advantageous results are obtained—especially at sulfide ion concentrations near the lower end of the useful range—when the source of sulfide ion is an aqueous solution of a soluble metal sulfide, the concentration of which is about 10 percent.

DESCRIPTION OF THE PREFERRED EMBODIMENTS

For a more complete understanding of the present invention, including its primary object and benefits, reference should be made to the description of the preferred embodiments thereof, which is set forth in detail below.

The present invention presents an improvement in well-known and commonly-employed continuous processes for producing filamentary vinyl polymers—i.e., those prepared by the polymerization and interpolymerization of compounds of the types $CH_2=CHX$ and $CH_2=CXY$—by the wet spinning technique. Exemplary of vinyl polymers having especial utility are acrylonitrile polymers or interpolymers such as: poly (acrylonitrile); acrylic copolymers and terpolymers containing at least about 85 percent of acrylonitrile and up to about 15 percent of other monomers such as vinyl acetate, methyl methacrylate and other alkyl esters of methacrylic acid, methyl acrylate and other esters of acrylic acid, vinyl bromide, vinyl monomers having an affinity for acid dyestuffs, particularly those having a tertiary or quarternary nitrogen in the molecule such as vinyl pyridine or methyl vinyl pyridine, vinyl monomers having an affinity for basic dyestuffs, particularly those having a sulfonic or carboxylic acid group such as alkyl sulfonic acid and itaconic acid; and modacrylic polymers, exemplary of which is the following composition: 84 percent acrylonitrile; 10 percent methyl acrylate, 5 percent vinyl bromide, and 1 percent 2-sulfoethyl methacrylic acid.

In such processes, the vinyl monomer or mixture of vinyl monomers is first polymerized in a concentrated aqueous inorganic salt solution to produce a solution of the vinyl polymer. Examples of inorganic salts commonly and advantageously employed commercially are zinc chloride, and sodium and calcium thiocyanates. Beneficially utilized in such polymerizations include hydrogen peroxide/ferric ion systems; sodium, potassium, or ammonium peroxydisulfates; $\alpha,\alpha'$-azobisisobutyronitrile; and other like materials.

The resulting vinyl polymer solution is then extruded through a spinnerette into a coagulating bath which affords a controlled precipitation of the vinyl polymer from solution to form a coherent filamentary gel. In the coagulating bath the coagulating liquid is normally an aqueous solution of the same inorganic salt as that employed in the polymerization step, in order to simplify the recovery problem and effect economy of operation. The concentration of inorganic salt in the coagulating bath is maintained at a level to ensure that the solution thereof is a non-solvent for the vinyl polymer; and precipitation of the vinyl polymer to form a coherent filamentary gel is thereby afforded. The temperature of the coagulating bath is generally carefully controlled within certain empirically-determined limits, in order to ensure that the precipitated filamentary gel is substantially clear and tough and can be subsequently stretched to orient the molecules thereof, thereby enhancing the tensile strength and toughness of the filament.

Following coagulation, the filamentary vinyl polymer is washed—generally countercurrently with water—to remove the inorganic salt, which is subsequently recovered as a concentrated solution from the washing and coagulating steps by concentrating (as by evaporating) the combined effluents thereof. Such concentrated aqueous inorganic salt solution is then recycled into the polymerization step, and the filamentary vinyl polymer is then stretched, finished, crimped, dried, cut, and baled, or packaged in a tow, by well-known, standard procedures. A review of many of the well-known and commonly-employed such processes, upon which the improvement of the present invention is based, may be found in C. W. Davis and Paul Shapiro, "Acrylic Fibers", Encyclopedia of Polymer Science and Technology, Volume I, page 342ff, Interscience, New York, 1970.

In such a process as set forth above, wherein the inorganic salt is recovered as a concentrated solution from the washing and coagulation steps by combining the effluents thereof, and concentrating the same, as by evaporation, and wherein such recovered concentrated aqueous inorganic salt solution is recycled into a polymerization step; unreacted monomer, low molecular weight polymer, and a number of other organic molecular impurities, as well as metallic ion impurities such as copper ion accumulate, resulting in an adverse effect upon both polymerization activity and the final quality of the filamentary vinyl polymer product.

The improvement according to the present invention comprises purifying the recovered aqueous inorganic salt solution prior to the re-utilization thereof by introducing a source of sulfide ion into the aqueous inorganic salt solution in an amount sufficient to provide a concentration of about 2 to about 200 ppm of sulfide ion, based upon the concentrated aqueous inorganic salt solution; and subsequently removing the precipitate resulting from said sulfide ion introduction. By sulfide ion is meant "normal sulfide"—viz. $S^=$—as well as "acid sulfide"—viz. $HS^-$—as is commonly employed and well understood by those of skill in the art. Of the many useful sources of sulfide ion are aqueous solutions of the following: $H_2S$, $Na_2S$, $K_2S$, $(NH_4)_2S$, $BaS$, $NaHS$, among many others which are readily available commercially. As is understood by those of skill in the art, the particular form in which the sulfide ion exists (viz., "normal" or "acid") is dependent upon pH.

As a result of such sulfide ion introduction, a precipitate is formed in the aqueous inorganic salt solution, and copper ions, which are recognized as chain terminators, are removed therefrom as a result. The precipitate is conveniently separated from the recovered aqueous inorganic salt solution by standard filtration techniques. However, other means such as centrifugation may be employed if desired. When the concentration of sulfide ion in the recovered aqueous inorganic salt solution is to be at or near the lower end of the useful range set forth above, it has been found advantageous—i.e., precipitation is more readily and efficiently effected—if the source of sulfide ion is an aqueous solution of a soluble metal sulfide the concentration of which is about 10 percent by weight.

The introduction of sulfide ion and removal of resulting precipitate may be effected in the recovered aqueous inorganic salt solution either before or after concentration thereof, which is readily and conveniently accomplished by evaporation of water therefrom, as by heating. However, it has been found of some advantage under certain conditions to carry out the precipitate removal step of the procedure of the present invention after final concentration of the recovered aqueous inorganic salt solution, during which concentration $H_2S$ is removed along with evaporated water.

The temperature of the inorganic salt solution to be treated may vary between wide limits (e.g., from 0° C. to 100° C.) without any adverse effect on the efficiency of the process according to the present invention. However, temperatures of 15° C. to 30° C. are very conveniently employed. The optimum pH of the inorganic salt solution to be treated according to the present invention is determined empirically. By way of example, when the predominant inorganic salt component is zinc chloride, the pH of the solution to be treated should be between about 2.0 and 5.5 (on a 10 percent zinc chloride basis) with the range 3.0 to 4.0 being preferred.

After introduction of sulfide ions, removal of the precipitate formed, and concentration of the recovered aqueous inorganic salt solution, the pH thereof is adjusted to the proper level for the subsequent polymerization step (e.g., in the case of $ZnCl_2$ to about 3.0), and the solution is then introduced into the polymerization reactor at a predetermined rate, so that desired conditions within the reactor will result.

As a result of the employment of the process according to the present invention, the recovered aqueous inorganic salt solution has significantly enhanced polymerization activity, as compared with an untreated control. That is to say, in the absence of a treatment according to the process of the present invention, the polymerization activity of a recycled aqueous inorganic salt solution becomes unsatisfactory after as few as 2 or 3 polymerizations. (Cf. Matsushita, supra.) With the improvement which is the present invention, on the other hand, the polymerization activity of the recycled aqueous inorganic salt solution remains satisfactory after as many as 20 polymerizations. Moreover, the final filamentary vinyl polymer product is at least equal in fiber heat stability and fiber whiteness when compared with otherwise identical products prepared by otherwise identical processes omitting the treatment of the present invention. Although the mechanism of the activation of the recovered aqueous inorganic salt solution is not adequately understood at the present time, its efficacy is without question.

The present invention may be better understood by a reference to the following illustrative examples, wherein all parts or percentages are by weight.

EXAMPLE 1

A zinc chloride solution consisting of about 58 percent zinc chloride and about 42 percent water was used as a solution polymerization medium. To 85 parts of this medium was added 15 parts of a mixture consisting of 91 percent acrylonitrile, 7.5 percent methyl acrylate, 1.48 percent of a zinc salt of a vinyl sulfonic acid, and 0.02 percent of hydrogen peroxide. Polymerization was effected in standard equipment, after which the vinyl polymer solution was spun through a standard spinnerette into a coagulation bath consisting of about 35 percent aqueous zinc chloride. The bath was maintained at a temperature of about 30° C. The zinc chloride concentration of the bath was adjusted by a counter-current flow of aqueous zinc chloride from a wash bath downstream of the coagulation bath. Overflow from the coagulation bath was concentrated by evaporation of water to about 35 percent zinc chloride in a stirred vessel. The pH thereof was adjusted to approximately 2.5 (10 percent zinc chloride basis), and a 20 percent aqueous solution of NaHS was added thereto in an amount sufficient to provide 10 ppm of $S^=$. The solution was then concentrated to 60 percent zinc chloride by evaporation of water therefrom, agitated for about 2 hours, after which the sulfide precipitate was removed therefrom by standard filtration techniques. The pH of the filtrate was adjusted to 3.0 (10 percent zinc chloride basis), and the so treated solution was then utilized as a polymerization solvent exactly as set forth hereinabove, without any deleterious effects on fiber properties. The polymerization quality of the so treated solution was determined to be excellent by means of a standard adiabatic polymerization test.

EXAMPLE 2

In a process substantially identical to that employed in Example 1 above, a polymerization/purification/recycle and re-use sequence according to the present invention was accomplished 20 times in succession without any deleterious effects on, or diminution of polymerization activity. The filamentary vinyl polymer gel was continuously washed countercurrently with water, stretched, finished, crimped, dried and cut into staple lengths. Fiber heat stability and fiber whiteness, as determined according to the procedures set forth below, were as good as such properties of otherwise identical filamentary products which were prepared by similar processes omitting the purification step which is the improvement according to the present invention.

Fiber Heat Stability: a fiber pad is subjected to dry heat at 125° C. for 45 seconds and 200° C. for 5 minutes. The heat stability of the fiber is determined as a percentage decrease in reflectance (white light) of the fiber pad.

Fiber Whiteness: this is determined as the reflectance of white light from a pad of the fiber compared with the reflectance from a standard white tile.

EXAMPLE 3

In each of a series of individual experimental runs, a vinyl monomer mixture was polymerized in a concentrated aqueous inorganic salt solution to produce a vinyl polymer solution, employing standard techniques and equipment. The resulting vinyl polymer solution was then spun through a spinnerette into a coagulating bath containing an aqueous solution of the same inorganic salt as that employed in the polymerization step, the concentration of inorganic salt in the coagulating bath and the temperature thereof being maintained at values which afforded precipitation of the vinyl polymer to form a coherent filamentary gel. The filamentary gel so produced was washed countercurrently with water, and the aqueous salt solution was recovered from the washing and coagulation steps by concentrating the combined effluents thereof. The recovered aqueous inorganic salt solution was in some instances purified and activated according to the present invention by the addition of a 10 percent solution of soluble sulfide ion to the recovered aqueous inorganic salt solution in an amount sufficient to provide a given concentration, as set forth in Table I below; after which the inorganic salt solution was concentrated by evaporation of water therefrom, and the sulfide precipitate was removed therefrom by standard filtration techniques. In a control run for comparative purposes, no sulfide ion was added to the recovered aqueous inorganic salt solution. In each instance the recovered aqueous inorganic salt solution was then adjusted to the proper pH, after which it was evaluated for polymerization quality by a standard adiabatic polymerization test. The results of these individual runs are summarized in the following Table I.

TABLE I

| Run No. | Vinyl Monomer (Mixture) | Polymerization Initiator, % | Inorganic Salt Solution As Polymerization/ Spinning Medium | Sulfide Ion Added, ppm (based on concentrated salt solution) | Polymerization Quality (Activity) of Recovered Salt Solution |
|---|---|---|---|---|---|
| 1. (This invention) | 15 parts of mixture comprising 91% acrylonitrile 7.5% methylacrylate 1.5% zinc salt of vinyl sulfonic acid | $H_2O_2$ 0.02% | 85 parts of 58% $ZnCl_2$ | 5 | Good |
| 2. (This invention) | 15 parts of mixture comprising 91% acrylonitrile 7.5% methylacrylate 1.5% zinc salt of vinyl sulfonic acid | $H_2O_2$ 0.02% | 85 parts of 58% $ZnCl_2$ | 10 | Excellent |
| 3. (This invention) | 15 parts of mixture comprising 91% acrylonitrile 7.5% methylacrylate 1.5% zinc salt of vinyl sulfonic acid | $H_2O_2$ 0.02% | 85 parts of 58% $ZnCl_2$ | 64 | Outstanding |
| 4. (Control for Comparison) | 15 parts of mixture comprising 91% acrylonitrile 7.5% methacrylate 1.5% zinc salt of vinyl sulfonic acid | $H_2O_2$ 0.02% | 85 parts of 58% $ZnCl_2$ | 0 | Poor |

What is claimed is:

1. In the continuous process for producing a filamentary vinyl polymer including the procedural steps of
   (a) polymerizing a vinyl monomer in a concentrated aqueous inorganic salt solution to produce a vinyl polymer solution;
   (b) spinning the resulting vinyl polymer solution through a spinnerette into a coagulating bath containing an aqueous solution of the same inorganic salt as that employed in the polymerization step, the concentration of inorganic salt in the coagulating bath being maintained at a level which affords precipitation of the vinyl polymer to form a coherent filamentary gel;
   (c) washing the vinyl polymer filamentary gel so produced;
   (d) recovering the concentrated aqueous inorganic salt solution from the washing and coagulation steps by concentrating the combined effluents thereof, and
   (e) recycling the recovered concentrated aqueous inorganic salt solution into the polymerizing step; in which process copper ion impurities accumulate in the recovered concentrated aqueous inorganic salt solution; the improvement in such process for removing copper ion impurities from the recovered aqueous inorganic salt solution and activating such recovered aqueous inorganic salt solution prior to the re-utilization thereof in the polymerization step, the improvement comprising:
   (1) introducing a source of sulfide ion into the recovered aqueous inorganic salt solution in an amount sufficient to provide a concentration of about 2 to about 200 ppm of sulfide ion, based upon the concentrated aqueous inorganic salt solution; and
   (2) removing precipitate resulting from said sulfide ion introduction.

2. The process improvement of claim 1, wherein the vinyl polymer is an acrylonitrile polymer or interpolymer.

3. The process improvement of claim 2, wherein the aqueous inorganic salt solution comprises zinc chloride as the principal inorganic salt component, and the polymerization step is accomplished utilizing a peroxide initiator system.

4. The process improvement of claim 3, wherein the source of sulfide ion is an aqueous solution of a soluble metal sulfide, the concentration of which is about 10 percent by weight.

* * * * *